(12) United States Patent
Copeland

(10) Patent No.: US 8,202,919 B2
(45) Date of Patent: *Jun. 19, 2012

(54) MOLD INHIBITING WATERPROOFING COATING

(75) Inventor: James L. Copeland, Apple Valley, MN (US)

(73) Assignee: Polyguard Products, Inc., Ennis, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/897,010

(22) Filed: Oct. 4, 2010

(65) Prior Publication Data

US 2011/0021659 A1    Jan. 27, 2011

Related U.S. Application Data

(63) Continuation of application No. 11/635,391, filed on Dec. 6, 2006, now Pat. No. 7,825,171.

(60) Provisional application No. 60/742,894, filed on Dec. 7, 2005.

(51) Int. Cl.
*B05D 7/00* (2006.01)
*C08K 5/01* (2006.01)

(52) U.S. Cl. ........................ 523/122; 524/492; 427/407.1

(58) Field of Classification Search .................. 523/122; 524/492; 427/407.1
See application file for complete search history.

(56) References Cited

U.S. PATENT DOCUMENTS

| | | | |
|---|---|---|---|
| 5,319,049 A | 6/1994 | Yoshioka et al. | |
| 5,482,737 A | 1/1996 | Gaveske | |
| 5,576,062 A | 11/1996 | Gaveske | |
| 5,576,065 A | 11/1996 | Gaveske | |
| 5,624,714 A | 4/1997 | Gaveske | |
| 5,736,197 A | 4/1998 | Gaveske | |
| 6,025,032 A | 2/2000 | Gaveske | |
| 6,230,452 B1 | 5/2001 | Gaveske | |
| 6,350,810 B1 | 2/2002 | Gaveske | |
| 6,632,882 B2 | 10/2003 | Gaveske | |
| 2001/0021418 A1 | 9/2001 | Gaveske | |
| 2002/0032263 A1 | 3/2002 | Gaveske | |
| 2002/0086039 A1* | 7/2002 | Lee et al. | 424/401 |
| 2004/0059036 A1 | 3/2004 | Gaveske | |
| 2005/0058689 A1* | 3/2005 | McDaniel | 424/426 |
| 2005/0058698 A1* | 3/2005 | Nolan et al. | 424/450 |
| 2005/0126430 A1* | 6/2005 | Lightner et al. | 106/15.05 |

OTHER PUBLICATIONS

Glaser, Aviva "The Ubiquitous Triclosan", vol. 24, No. 3, 2004, pp. 12-17.

* cited by examiner

*Primary Examiner* — Robert D. Harlan
(74) *Attorney, Agent, or Firm* — Merchant & Gould P.C.

(57) ABSTRACT

The present invention relates to a waterproofing and air barrier coating composition that can inhibit mold formation on interior structural surfaces. The coating composition includes a broad spectrum antimicrobial agent and a waterproofing polymeric composition that can also prevent air penetration. The polymeric composition includes a solvent, a hydrocarbon resin, a polymeric composition, and a filler. The present invention also relates to methods for preparation of such a waterproof coating composition, and methods for preventing mold formation on a structural unit, by applying a coating composition to a surface of the structural unit.

14 Claims, No Drawings

MOLD INHIBITING WATERPROOFING COATING

CROSS REFERENCE TO RELATED APPLICATION

The present application is a continuing application of U.S. Ser. No. 11/635,391, filed on Dec. 6, 2006, which has now issued as U.S. Pat. No. 7,825,171. The Ser. No. 11/635,391 application claims benefit of U.S. Provisional Application No. 60/742,894, filed Dec. 7, 2005. Each of U.S. Ser. Nos. 11/635,391 and 60/742,894 is incorporated herein by reference. A claim of priority to each of U.S. Ser. Nos. 11/635,391 and 60/742,894, is made, to the extent appropriate.

FIELD OF THE INVENTION

This invention relates generally to the field of waterproofing and sealing structures to prevent air penetration. In particular, the invention relates to a method of waterproofing, preventing air penetration, and inhibiting mold growth in a structural unit using a composition that includes a polymeric composition used for waterproofing and an antifungal or antimicrobial agent.

BACKGROUND OF THE INVENTION

Structures used in construction, such as foundations and walls, include materials, such as masonry, cement, wood, plaster, stone, clay or brick that may be porous. Such porous materials are susceptible to cracking and can be degraded by water and/or loss of water from the porous materials. Below grade structures are often subjected to hydrostatic pressure from ground water. Above grade structures are subject to precipitation, moisture migration, air penetration, and water from other sources. A variety of methods and products for waterproofing and/or sealing these structures against outside water have been developed.

Moisture accumulation in a structure leads to mold growth, a significant problem in residential and commercial buildings. Buildings are often constructed with a cavity between structural walls and interior walls to trap air and moisture, which helps significantly reduce energy costs, especially for commercial buildings. The presence of excessive moisture and humidity inside the structural cavity promotes the growth of mold or mildew. Mold accumulation is the cause of two major problems. First, mold has a significant negative effect on many building materials including, but not limited to, materials used to waterproof or dampproof structures. For example, adhesives used to fasten waterproof polyvinyl sheeting to the surface of a structure can be attacked by mold and will degrade over time, eliminating the waterproofing ability of the polyvinyl sheeting. Furthermore, mold can also degrade waterproofing sealants made from tar or asphalt. These compositions contain large amounts of organic material, which is readily attacked by mold and thereby rendered ineffective as water barriers. Second, the mold in building cavities is dispersed into the building air and can cause illness and even death to the occupants of the building. Such buildings are known as "sick buildings" and this is a major health concern for commercial buildings and school buildings.

Biocides, including antimicrobial and antifungal agents, have been added to materials like paints and sealants to prevent the staining and discoloration of building surfaces caused by mold growth. However, many antimicrobial agents tend to be water soluble and can be easily leached out or washed away by rainfall. Furthermore, antimicrobial treatments applied to painted or sealed surfaces may not be effective, because the antimicrobial agent cannot diffuse through the paint or sealant to protect the underlying material. Some antimicrobial agents also cannot be applied directly to building materials because of the adverse effects of the agent on the material. For example, an antimicrobial agent added directly to cement may react with the cement and weaken it over time. Some antimicrobial agents are not properly incorporated into the matrix of building materials, and sensitive individuals can develop contact allergies from such antimicrobial agents.

Therefore, there is a need for alternative methods of preventing mold formation on structural surfaces. The ideal mold-inhibiting coating will incorporate an appropriate antimicrobial agent into its matrix, thereby allowing for adequate protection of the material while preventing harmful contact allergies to individuals. Furthermore, the ideal mold prevention coating also should act as a barrier against water or moisture to prevent further degradation of the structure, and to prevent loss of the biocidal agent by dissolution in water.

SUMMARY OF THE INVENTION

The present invention relates to a waterproof coating composition that can inhibit mold formation on interior structural surfaces. The coating composition includes a biocidal agent and a waterproofing polymeric composition. The polymeric waterproofing composition includes a solvent, a hydrocarbon resin, a polymeric composition, and a filler. Accordingly, in one aspect, the present invention is a waterproofing mold-resistant coating composition for structural surfaces that includes a biocidal agent incorporated into a polymeric composition comprising a styrene-based polymer, an olefin-based polymer, or mixtures thereof.

In another aspect, the present invention also relates to methods for preventing mold formation on a structure, employing the steps of: applying a coating composition to the surface of the structure, the coating composition comprising a biocidal agent and a polymeric waterproofing composition. The waterproofing composition further comprises an organic solvent, a hydrocarbon resin, a polymeric composition, and a filler.

In a further aspect, the present invention relates to a method for preparation of a mold-inhibiting waterproofing composition, the method comprising the steps of: mixing an organic solvent with a portion of filler, slowly adding in a broad spectrum antimicrobial agent, followed by the addition of a polymer such as a polymer with styrene monomer units, a polymer with olefin monomer units, or a copolymer with styrene and olefin monomer units, and mixing the remainder of the filler.

The above summary of the present invention is not intended to describe each disclosed embodiment or every implementation of the present invention. The detailed description that follows more particularly exemplifies the disclosed embodiments, but does not limit the scope of the invention, as defined by the claims.

DETAILED DESCRIPTION

Various embodiments of the present disclosure will be described in detail. Reference to various embodiments does not limit the scope of the disclosure, which is limited only by the scope of claims attached hereto. Additionally, any examples set forth in this specification are not intended to be limiting and merely set forth some of the many possible embodiments for the claimed invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, the preferred methods and materials are now described. Methods recited herein may be carried out in any order that is logically possible, in addition to a particular order disclosed.

The present invention is believed to be applicable to methods and coating compositions for preventing mold growth on the surface of a substrate. In particular, the present invention is directed to coating compositions and methods using a combination of an antimicrobial agent and a polymeric waterproofing component. The polymeric waterproofing component further comprises a polymer or mixture of polymers, an organic solvent, and a filler.

The term "polymer" includes homopolymers, terpolymers, and copolymers, unless otherwise indicated.

The term "monomer unit" indicates a unit of a polymer, which is derived from, or has the same chemical structure as, a unit derived from a particular monomer.

The term "substrate" includes any surface that is capable of being coated with the composition of the invention.

The term "biocide" refers to any substance that destroys or inhibits the growth of bacteria, mold, mildew, algae, or lichens, which includes, but is not limited to, antimicrobial agents, antifungal agents, bactericidal agents, germicides, insecticides, and the like.

The term "antimicrobial agent" refers to any substance, such as a chemical or biological compound, that, at low concentrations, can eliminate or inhibit the growth of microorganism without adversely affecting the host compound or organism. For the purpose of this disclosure, the terms "biocide" and "antimicrobial agent" are used interchangeably.

A preferred substrate is a "structural unit." The term "structural unit" includes, by way of example, foundations, basement walls, retaining walls, cement posts, other building walls, dry wall, pool enclosures, tub and shower enclosures, highway structures (e.g., posts and walls), wooden or metal fence posts, sheet rock, plywood, wafer board, wall sheeting, pressed board, containment basins and walls, fabricated walls, floor panels, roofs, plaza decks, decks, floors, concrete, pre-stressed concrete other substrates that are buried or are exposed to water or weathering conditions, and the like. These structural units are typically made from masonry, cement, wood, plaster, stone, gypsum, clay, brick, tile, terra cotta, cardboard, paper, and the like.

Structural Units

The present invention is useful in methods for protecting above ground masonry and concrete structures that are susceptible to mold growth, such as the interior walls of commercial and residential buildings. These structures may include poured concrete, block and mortar, and the like. Basically, the invention is useful to prevent mold growth on waterproofing structures that can act either as air barriers or water barriers. Elastomeric compositions are useful for coatings on structural units, which are less flexible than the coating itself. In other words, if the waterproof coating which results from the application of the liquid coating composition is slightly more flexible and elastic than the surface to be coated, the movement of that surface after application of the coating will not cause cracks in the coating. Therefore, the coating will remain an effective water and air barrier.

The structures may also have defects that require filling prior to coating. Such defects can be cracks and fissures, and they can be a result of concrete form ties, cold joints in concrete, and the like.

Antimicrobial Agent

The biocide of the coating composition may be an antimicrobial agent including an agent that is highly effective against a wide range of Gram positive and Gram negative bacteria. In one aspect, the antimicrobial agent prevents growth of microorganisms such as bacteria or mold on plastic or polymer surfaces, where the growth of bacteria or mold is accompanied by discoloration and odor formation. In another aspect, the antimicrobial agent is selected for its compatibility with the polymer components of the invention. In a preferred embodiment, the antimicrobial agent can be a broad-spectrum biocide, such as a triclosan compound including, which is compatible with polymers such as polyolefins and polystyrenes. The antibacterial activity of triclosan is known to those of skill in the art, but triclosan is not known to have significant antifungal effect, when applied to polymers or plastics. Commercially available forms of triclosan include, for example, Irgaguard® B 1000 (Ciba Specialty Chemicals, Tarrytown, N.Y.).

Waterproofing Polymer Component

The polymer component of the coating composition may be a styrene-based polymer including a styrene homopolymer (polystyrene), a copolymer including styrene, a styrene-based terpolymer, a mixture of polystyrene and one or more polymers, or a combination of the above. Preferably, the styrene-based polymer component includes a styrene content of greater than about 60 wt %. More preferably, the styrene-based polymer component includes a styrene content of greater than about 80 wt %.

The styrene copolymer may comprise a styrene and a rubbery diene co-monomer including isoprene, butadiene, and the like, or it may comprise co-monomers such as acrylonitrile, acrylates, olefins such as butylene, and the like. These copolymers may be random or block copolymers. The styrene-based polymer can be a general purpose grade, crystalline, high impact, or medium impact grade of polystyrene. Increasing amounts of styrene copolymers such as styrene-butadiene and styrene-isoprene tend to increase the difficulty in completely dissolving the polymer component, but it is possible to use high impact polystyrene and medium impact polystyrene polymers in the present invention. Preferably, the styrene-based polymer comprises a general purpose grade or high impact grade of polystyrene.

The polymer used may include a combination of up to three types of polymers. These three types include a) styrene-diene copolymers having a styrene content of 60 wt % or greater and typically from about 85 to 99 wt % and preferably, from about 90 to 99 wt %, b) a copolymer having styrene and olefin monomer units with a styrene content of 60 wt % or greater, and c) polymers having styrene monomer units with a styrene content of 60 wt % or greater and typically from about 85 to 99 wt % and preferably, from about 90 to 99 wt %. The combination of polymers is typically chosen to produce a durable film with the desired properties. The styrene content can be varied to produce a coating that has either elastomeric or thermoplastic properties.

Typical diene monomer units include butadiene and isoprene. Butadiene is the preferred diene monomer unit. Typical olefin monomer units include ethylene, propylene, butylene (i.e., 1-butene and isomers), and isobutylene (i.e., isobutene). Preferred olefin monomer units include ethylene, butylene, and isobutylene.

The hardness and durability of the coating composition can be improved by including a polymer component having a relatively high styrene content (greater than 60 wt %, for example). High styrene content polymers may be styrene homopolymers, or copolymers of styrene with, for example, one or more diene, olefin, acrylonitrile, and/or acrylate monomer units. Suitable high styrene-content polymers include, for example, polystyrene homopolymer, high impact polystyrene (HIPS), and medium impact polystyrene (MIPS). Both HIPS and MIPS are often copolymers of styrene and a diene, such as butadiene. HIPS and MIPS typically have styrene content in the ranges of 60 wt % to 99 wt %. Typically, HIPS has a styrene content of at least about 85% and preferably at least about 90 wt %. Typically, MIPS has a styrene content of at least about 85 wt %, and preferably at least about 95 wt %. Commercially available HIPS copolymers include, for example, HIPS Hunstman HiVal 5308L (Ashland Specialty Chemical Co., Columbus, Ohio).

The impact resistance and elasticity of films formed using coating compositions having high styrene-content polymers typically increases as the overall diene content increases. The diene content of the coating composition may be modified, for example, by using a polymer with higher diene-content or decreasing the amount of the high styrene-content polymer in the polymeric component. The impact resistance of the film may also be modified by the addition of a plasticizer. On the other hand, the hardness of films formed using these polymers typically decreases as the diene content increases. Thus, the desired properties of the film may be tailored by varying the polymer composition.

Polymers with a styrene content of less than 60 wt % may be optionally added to the polymeric component. These polymers include styrene-diene copolymers and styrene-olefin copolymers. One example of a suitable styrene-diene copolymer is a styrene-diene-styrene triblock copolymer, which has two endblocks of polymerized styrene monomer units, separated by a central block of polymerized diene monomer units. Suitable triblock polymers include, for example, styrene-butadiene-styrene (S-B-S) polymers and styrene-isoprene-styrene (S-I-S) polymers. Commercial S-B-S and S-I-S polymers include, for example, many of the Kraton® D 1100 Series polymers and Stereon® Block Copolymers from Firestone Synthetic Rubber & Latex Co. (Akron, Ohio). For example, Kraton® D 1101 and D 1102 are S-B-S polymers and Kraton® D 1107 is an S-I-S polymer. These copolymers typically have a styrene content of about 5 to 60 wt % and usually about 10 to 35 wt %.

Another example of a suitable styrene-diene copolymer is a styrene-diene diblock polymer, such as a styrene-butadiene (S-B) copolymer or a styrene-isoprene (S-I) copolymer. Commercially available triblock polymers often include at least some diblock polymer.

The styrene-diene copolymer portion of the polymer component of the composition may include at least one block copolymer. Random copolymers may also be used, particularly in combination with a block copolymer or copolymers.

The polymer component may include at least one styrene-olefin copolymer, with a typical styrene content less than 60 wt % and preferably ranging from about 10 wt % to about 60 wt %, and more preferably, about 20 wt % to about 50 wt %. Such copolymers combine the hardness of the styrene monomer units with the elastomeric properties of the olefin monomer units. The styrene-olefin copolymer portion of the polymeric component typically includes at least one block copolymer, however, random copolymers may also be used, particularly in combination with block copolymers. Examples of styrene-olefin copolymers include styrene-ethylene-butylene-styrene (S-EB-S) block copolymers, styrene-ethylene-propylene-styrene (S-EP-S) block copolymers, styrene-ethylene-butylene (S-EB) block copolymers, and styrene-ethylene-propylene (S-EP) block copolymers. Examples of these copolymers include Kraton® G 1600 and 1700 series polymers and Kraton® FG 1900 series polymers. A preferred polymer of this type is the styrene-ethylene-butylene-styrene polymer, such as, for example, many of the Kraton® G 1600 Series polymers, including Kraton® G 1650 and 1652 polymers.

The polymeric component may additionally include at least one polyolefin. Suitable examples of polyolefins include polyethylene, polypropylene, and polybutene. Preferred polyolefin include polyethylene, polybutene, polyisobutylene, and polymers having a combination of butylene and isobutylene monomer units (e.g., a polymer having about 25 to 30 wt % of isobutylene monomer units and about 70 to 75 wt % butylene monomer units). Polyolefins may be obtained from a variety of manufacturers and distributors.

The above polystyrene polymers can be mixed with rubbery polymers to form the coating composition. Such rubbery polymers include, for example, unvulcanized natural rubber, chlorinated natural rubber, chlorinated sulfonated polyethylene rubber, styrene-butadiene rubber, polybutene rubber, chlorinated paraffin, and mixtures thereof.

The styrene-based polymers used in the present invention may be modified by plasticizers, coupling agents, and the like. Such modified polymers include high impact polystyrene such as styrene-butadiene modified high impact, and medium impact polystyrene.

Solvents

The polymers and resins that form the polymer component of the coating composition are dissolved and/or dispersed in an organic solvent to form a coating composition. The amount of solvent used determines the drying time, and appropriate method of application for the coating composition. A variety of solvents may be used. Suitable solvents that are commonly used include, for example, aromatic hydrocarbons, cycloaliphatic hydrocarbons, terpenes, unsaturated hydrocarbons, organic carbonates, and halogenated aliphatic and aromatic hydrocarbons. Suitable solvents include toluene, xylene, benzene, halogenated benzene derivatives, ethyl benzene, naphtha, cyclohexane, methylene chloride, ethylene chloride, trichlorethane, chlorobenzene, propylene, ethylene carbonate, nitropropane, acetone, ethyl acetate, propyl acetate, butyl acetate, and isobutyl isobutyrate. Preferred solvents are aromatic hydrocarbons, such as toluene, xylene, benzene, and halogenated benzene derivatives. Mineral spirits can be used as a diluent in combination with a solvent.

For environmental reasons, it is desirable to use as little solvent as possible in the coating composition. The lower limit on the amount of solvent may be determined by the amount of solvent needed to solvate and/or disperse the components of the coating composition. If too little solvent is used, then the coating composition may be too viscous for the particular application. On the other hand, if too much solvent is used, the coating composition may not have the necessary viscosity to ensure that a proper coating is deposited on the structural unit and an excessive amount of VOCs are emitted into the environment. This can result in a film that may be thin, easily punctured, and/or have an unacceptable amount of pinholing. In addition to the use of a solvent, the viscosity of a coating composition may often be reduced by warming the coating composition.

Fillers

The coating composition typically includes a filler. The filler may increase the strength of the coating composition and/or replace costly materials of the polymeric component. The filler may also modify the physical properties of the coating composition and films formed using the coating composition, including, for example, the color, opacity, affinity for other coatings, density, rheology, stiffness, and modulus of the coating composition and/or film. Any particular filler may have one or more of these, or other, functions in the coating composition.

In addition, a coating composition with a filler may more easily and reliably cover holes, depressions, recesses, cracks, and crevices in a substrate, for example, in masonry blocks, concrete, wood, and other porous or rough substrates. The presence of a filler may reduce the size and number of pinholes in a film formed from the coating composition. These pinholes arise, at least in some cases, because of gravity and/or capillary action that draws the coating composition into the hole, depression, recess, crack, or crevice in the substrate, creating a break or pinhole in the resulting film. The filler often includes particles that, because of their larger size, provide structural support that, in combination with the polymeric component, forms a film across or fills the hole, depression, recess, crack, or crevice. This reduces the tendency to form pinholes.

Suitable fillers include, for example, carbonates, clays, talcs, silicas including fumed silica and amorphous silica, silico-aluminates, aluminum hydrate, metal oxides (e.g., oxides of aluminum, iron, zinc, magnesium, and titanium), silicates (e.g., mica), sand, Portland cement, carbon filaments, glass, fiberglass, cellulose, graphite, mortar powder, calcium carbonate, sulfates (such as magnesium or calcium sulfates), and the like. Preferred fillers include sand, titanium dioxide, oxides, and clay.

More preferable fillers include ground sand materials. For example, preferred sands are those of a particle size that allows at least 60 percent of the material to pass through a 325 mesh screen. Preferred sands have a Blaine air permeability, according to ASTM International C204-00 ("Standard Test Method for Fineness of Hydraulic Cement by Air Permeability Analysis"), expressed as total surface area of from about 2100 to 3200 square centimeters per gram of material.

Some ground sand materials may include crystalline silica such as quartz and Cristobalite. Commercial sand products include, for example, silica flour that can be obtained from Abrasive Technologies, Inc. (Woodbury, Minn.). Other commercial finely ground products include talcs, silicas, silicates, crystalline mica, and fumed silica. In other embodiments, a filler can include a mixture of particle sizes and different sand materials.

The amount of filler in the coating composition typically depends on the desired properties of the composition. These properties may include the strength, flexibility, ultraviolet radiation resistance, chemical resistance, permeability, and cost of the coating composition. Often more than one type of filler is used. A combination of fillers may provide desired advantages for the coating composition and/or overcome disadvantages arising from other components in the film. For example, a filler can include a mixture of sand and clay.

The filler component of the composition is useful to increase the strength of the resulting film layer. The filler also decreases the amount of the more expensive component needed in the composition, increases the bulk and weight of the resulting film, and otherwise modifies the physical properties of the film and film forming composition. The major modifications which can be achieved with fillers are changes of color or opacity, changes of density, increase of solids content, change of rheology, increase in stiffness or modulus of the coating, and changes in the affinity of the coating for various adhesives, cements, mortars, and the like.

Optional Components

The coating composition may optionally include a pigment or dye. The pigment or dye may impart a desired color to the coating composition and may be added for aesthetic purposes. The pigment or dye may also be included in the coating composition to, for example, aid the user in determining which portion of a surface has been covered by the coating composition. The pigment or dye may also absorb light, which can harm the film. For example, the pigment or dye may absorb one or more wavelengths of ultraviolet (UV) light.

Pigments and dyes may be powders, flakes, metal flakes, organic or organometallic molecules, and the like. Examples of suitable pigments and dyes include iron lakes, iron oxide, such a red, yellow, and black iron oxides, other metal oxides, and carbon black. These solids not only impart color to the composition to allow the user to determine coverage of the structure and to render the film coating relatively impervious to UV light, but also provide chemical resistance to the film coating. In addition to compounds used primarily as pigments or dyes, the coating composition may also include other components, such as the filler material, that also act as a pigment or dye. For example, titanium dioxide, which may also be a filler, is a pigment. In such cases, the amount of the filler/pigment (e.g., titanium dioxide) in the coating composition may be representative of that described above for the filler material.

Another optional additive is an antioxidant. Polymers with styrene and diene monomer units are unsaturated and are susceptible to attack by oxygen. An antioxidant may be added to the coating composition to prevent the oxidation of the polymers in the polymeric component. In some commercial polymers, an antioxidant is already provided with the polymer and additional antioxidant may not be needed. For example, commercial styrene-containing and diene-containing polymers, including the Kraton® Series D 1100 and G 1600 polymers, already have an amount of antioxidant added to the polymer to facilitate manufacturing, shipping, and storage. However, additional antioxidant may be added as desired or needed.

A variety of antioxidants are known and may be included in the coating composition. One suitable type of antioxidant includes a substituted phenolic compound. Commercial antioxidants of this type include Irganox® 1010 and 565 (Ciba-Geigy Co., Ardsley, N.Y.), Ethanox® 330 (Ethyl Corp., Baton Rouge, La.), and BHT (butylated hydroxytoluene, available from a variety of sources). Other types of antioxidants may also be used.

The coating composition may also include an ultraviolet (UV) absorber or blocker. This may be particularly useful in coating compositions that are exposed to sunlight or other sources of ultraviolet light. Examples of suitable UV absorbers or blockers include substituted benzotriazoles, hindered amines, benzophenones, and monobenzoates. Commercial UV absorbers or blockers include Tinuvin® P/300 Series and Tinuvin® 770 from Ciba-Geigy Co. (Ardsley, N.Y.), Cyasorb® UV 531 from American Cyanamid (Wayne, N.J.), and Eastman® RMB from Eastman Chemical Co. (Kingsport, Tenn.). Other types of UV absorbers or blockers may also be used.

Ozone blockers may also be used, particularly for coating substrates that will be exposed to air or to ozone-forming devices. Examples of ozone blockers include dibutyl thiourea, nickel dibutyl-dithiocarbomate (DuPont, Wilmington, Del.), Ozone Protector 80 (Reichhold Chemicals, Durham, N.C.) and the like.

The coating composition may also include a plasticizer. The plasticizer may be liquid or solid, and is present to increase the toughness and flexibility of the film coating. In many cases, a plasticizer is not needed as the combination of the polymers in the polymeric component plasticize each other. However, when desired or needed an additional plasticizer may be added. Examples of useful plasticizers include butyl stearate, dibutyl maleate, dibutyl phthalate, dibutyl sebecate, diethyl malonate, dimethyl phthalate, dioctyl adipate, dioctyl phthalate, butyl benzyl phthalate, benzyl phthalate, octyl benzyl phthalate, ethyl cinnamate, methyl oleate, tricresyl phosphate, trimethyl phosphate, tributyl phosphate, trioctyl adipate phthalate esters and the like. Other secondary plasticizers are known such as chlorinated paraffins, polyethylene wax, polybutenes, isoprenes, Kratons, and flexible rubber compounds. Persons skilled in the art will be able to select the type and requisite combination of properties needed in the plasticizer to modify the component. Preferred plasticizers include liquid phthalate plasticizers such as dioctyl phthalate, diethyl phthalate, butyl benzyl phthalate, benzyl phthalate, and octyl benzyl phthalate.

The amount of plasticizer used in the coating composition depends, at least in part, on the desired properties and the composition of the polymeric component. Typically, the more plasticizer, the more elastic the film, however, if the amount of plasticizer is too great than the cohesiveness of the film resulting from the coating composition may decrease. A plasticizer may be particularly useful in combination with high styrene-content polymers.

Other components may be used in the coating composition. For example, small amounts of colloidal silica (e.g., Cab-O-Sil® M-5 or TS-610, Cabot Corp., Tuscola, Ill.), particularly in combination with mineral spirits, may cause the volume of the coating composition and the resulting film to increase. Examples of other optional components of the coating composition includes for example, perfumes, deodorants, foaming agents and tackifiers. For example, a resin such as an aliphatic hydrocarbon resin can also be incorporated into the polymer mixture. The resin acts as a tackifier, reducing the viscosity of the styrene-based polymer mixture, and allowing for better wetting by the styrene-based polymer mixture, when applied on a surface. In a preferred embodiment, the resin is a C5 resin with low softening point and low molecular weight, such as Wingtack® 95 (Sartomer Co., Exton, Pa.) or Piccotac® 1095 (Eastman Chemical Co., Kingsport, Tenn.).

General Preparation Methods for Coating Compositions

The coating composition can be prepared by combining the organic solvent with between about 12 and 25 percent by weight of the total filler (including thickening agents) to be used in the composition. After mixing the solvent and a portion of the filler, the antimicrobial agent is slowly added to the solvent/filler mixture, and mixed for about 10 minutes. This is followed by addition of the polymer component and the resulting solvent/filler/polymer component/antimicrobial material is mixed until the polymer component is completely dissolved. The remaining filler is then added to mixture. The composition is then mixed for about 30 to 45 minutes.

A filler that includes sand and clay can be mixed prior to combining with the organic solvent/polymer component combination. Alternatively, the sand and clay can be added unmixed to the organic solvent/polymer component combination.

Mold Inhibiting Coating Composition

The liquid coating composition comprises a polymeric component, and an antimicrobial agent, dissolved in an aromatic hydrocarbon solvent, along with a filler. In a preferred embodiment, the liquid coating composition is a combination of about 10-20 wt % of a component comprising a polymer mixture; about 0.1 wt % to about 0.5 wt % of a broad spectrum antimicrobial agent; about 30-60 wt % of an organic solvent; and about 15-25 wt % of a filler, wherein the filler is of a size that at least 60 percent of the filler passes through a 325 mesh screen.

Optionally, one or more of the following can be included in the liquid composition: plasticizers; particulate solid pigments and opacifying agents; ultraviolet absorbers; ozone blockers; and antioxidants.

Application of the Coating Composition

A coating composition can be applied by a variety of techniques, including, for example, rolling, brushing, spraying, squeeging, backrolling, pouring, troweling, or otherwise coating the surface of the substrate. A preferred application technique is spraying the coating on the substrate. Combinations of these techniques may also be used including spraying the coating composition on the structural unit and then rolling or brushing the sprayed coating composition to obtain a more uniform coating. The coating composition may be used on both interior and exterior surfaces of structures, as well as on other surfaces that need to be waterproofed, or surfaces that require an air penetration barrier. In a preferred embodiment, the coating composition is used on interior walls of residential and commercial buildings to inhibit mold growth on these surfaces.

The desired viscosity of the coating composition often depends on the method of application of the coating composition. Coating compositions that are formulated for application using a brush or roller can often be more viscous than those formulated for spraying. The desired viscosity may also depend on whether the surface to be coated is a vertical surface, where a less viscous coating composition may run, or a horizontal surface.

Spraying the coating composition on the substrate requires a flowable coating composition. Many physical properties affect flowability, such as, for example, viscosity, temperature, and the like. Usually, as the viscosity is lowered, the easier it is to spray the coating composition. Normally as the temperature of the material rises, the easier it is to spray the coating composition. Coating compositions applied year round in northern latitudes typically require special attention to maintain the flowability of the composition.

The thickness of the coating will often depend on the particular surface and material of the structural unit, as well as the projected exposure to moisture. Rougher surfaces and surfaces in areas with more moisture may require a thicker coating. In addition, thicker coatings may be used in situations where the coating may be subject to puncturing. Thicker and thinner coatings may also be used depending, in part, on the desired use of the structural unit.

Upon drying, the coating composition becomes a film. Typical drying times range from 4 to 24 hours. The drying time can be as short as 1 hour or even less. Longer drying times may be required depending on the thickness of the applied coating composition, the air temperature and humidity and the desired amount of solvent that should be removed.

Imperfections and damage in the resulting dried coating can be simply repaired by application of additional liquid composition over the area to be repaired. The solvent carrier remelts the underlying coating, and the repaired area dries to form a continuous film. This is in marked contrast to prior art systems and most paints, which form layers with repeated applications.

EXAMPLES

The following examples further illustrate the invention. These examples are merely illustrative of the invention and do not limit the scope of the invention.

Example 1

Preparation of the Coating Composition

Several gallons of different coating compositions (Table 1, labeled A-D) were prepared using the following materials and amounts:

TABLE 1

Materials and Amounts for the Coating Compositions

| | A (wt %) | B (wt %) | C (wt %) | D (wt %) |
|---|---|---|---|---|
| Xylene | 51.86 | 54.49 | 54.49 | 59.50 |
| Bentone 38 (thickener) | 1.60 | 0.15 | 0.15 | 1.60 |
| Methanol | 0.25 | 0.20 | 0.20 | 0.25 |
| Water | 0.01 | 0.01 | 0.01 | 0.01 |
| Kraton ® G1650 | 10.45 | — | — | — |
| Kraton ® D1101K | — | — | — | 16.00 |
| Polystyrene Hi-Val 5308L (HIPS) | 2.15 | 15.00 | 15.00 | — |
| Wingtac ® 95 (tackifier) | 9.60 | — | — | — |
| Piccotac ® 95 (tackifier) | — | — | — | 7.50 |
| Indopol L50 (plasticizer) | 8.40 | — | 2.40 | 2.90 |
| Dioctyl phthalate (plasticizer) | — | 2.40 | — | — |
| Irgaguard ® B 1000 (antimicrobial) | 0.50 | 0.50 | 0.50 | 0.50 |
| Nyad ® G or Nytal ® 3300 (filler) | 12.85 | 24.20 | 24.20 | 9.41 |
| Carbon black tint | 0.13 | 0.05 | 0.05 | 0.13 |
| Titanium Dioxide Ti-Pure ® R-900 | 2.20 | 3.00 | 3.00 | 2.20 |

Bentone 38: modified organic clay, used as a thickening agent.
Kraton ® G1650: styrene-ethylene-butene block copolymer, with about 10 wt % to about 50 wt % of styrene.
Kraton ® D1101K: styrene-butadiene-styrene polymer, with about 5 wt % to about 60 wt % of styrene.
Polystyrene Hi-Va15308L: high-impact styrene-butadiene copolymer
Wingtac ® 95 and Piccotac ® 1095: low molecular weight C5 aliphatic resin, used as tackifiers
Indopol L50: isobutylene-butane copolymer, used as a plasticizer.
Irgaguard ® B1000: commercially available grade of the broad spectrum antibiotic triclosan, specifically for use with plastic and polymer materials.
Nyad ® G: calcium silicate, used as an inorganic filler.
Nytal ® 3300: hydrous calcium/magnesium silicate, used as an inorganic filler Generally, compositions A-D of Table 1 were prepared as follows:

The coating composition was prepared by combining the organic solvent with between about 12 and 25 percent by weight of the total filler (including thickening agents) to be used in the composition. After mixing the solvent and a portion of the filler, the antimicrobial agent was slowly added to the solvent/filler mixture, and mixed for about 10 minutes. This was followed by addition of the polymer component and the resulting solvent/filler/polymer component/antimicrobial material was mixed until the polymer component was completely dissolved. The remaining filler was then added to mixture. The composition was then mixed for about 30 to 45 minutes.

Each coating was sprayed or brushed onto a substrate. Each coating composition was allowed to dry on a substrate, such as a masonry block. The resulting films were solid with a minimum of pinholing and some coatings, with varying amounts of styrene, had elastomeric qualities.

Example 2

Mold Resistance Activity

Mildew or mold resistance of the composition was tested in accordance with Modified AATCC Method-Part II, "Antifungal Activity Mildew and Rot Resistance Assessment." The microorganism used for the test was *Chaetomium globosum* (ATCC 6205), a common fungus found in both soil and air, and considered a potent allergen. Several 3.8 cm sample specimens of sterile filter paper, either untreated, or treated with the mold-inhibiting composition, were inoculated with a *C. globosum* suspension, with or without a synthetic mycological growth medium (e.g., Czapek's solution). Following a 21-day incubation period, mold growth was assessed by visual comparison to untreated controls. Under the conditions of the study, untreated samples showed 90-95% growth of *C. globosum*, whether Czapek's solution was used or not. Polymeric waterproofing compositions without any added antimicrobial agents showed 20-25% growth of *C. globosum*, suggesting that the waterproofing polymer composition alone may be able to inhibit mold growth to a certain extent. In addition, sample specimens treated with the mold-inhibiting composition of the invention showed no visible growth of *C. globosum* after 21 days of exposure to the microorganism, with or without Czapek's solution, thereby demonstrating the efficacy of the coating composition as a mold growth inhibitor.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A composition for application to provide a water barrier coating on a construction surface comprising at least one of wood, cement, masonry, plaster, stone, clay and brick; the composition comprising:
    (a) aromatic hydrocarbon solvent;
    (b) styrene-based polymer; and,
    (c) an antimicrobial effective amount of triclosan.
2. A composition according to claim 1 wherein:
    (a) the solvent includes solvent selected from the group consisting essentially of: toluene, xylene, benzene and halogenated benzene derivatives.
3. A composition according to claim 1 wherein:
    (a) the solvent comprises xylene.
4. A composition according to claim 1 wherein:
    (a) the solvent comprises halogenated benzene derivative.
5. A composition according to claim 1 wherein:
    (a) the styrene based polymer comprises a polymer combination of styrene polymer and at least one other polymer.
6. A composition ion according to claim 5 wherein:
    (a) the polymer combination comprises styrene polymer and styrene-olefin copolymer.
7. A composition according to claim 6 wherein:
    (a) the polymer combination comprises styrene; and, at least one styrene-olefin copolymer selected from the group consisting essentially of: styrene-ethylene-butylene-styrene block copolymers; styrene-ethylene-propylene-styrene block copolymers; styrene-ethylene-butylene block copolymers; and, styrene-ethylene-propylene block copolymers.

8. A composition according to claim 1 including:
(a) filler.

9. A composition according to claim 8 wherein:
(a) the filler comprises material selected from carbonates, clays, talcs, silicas, silico-aluminates, aluminum hydrate, metal oxides, sand, Portland cement, carbon filaments, glass, fiber glass, cellulose, graphite, mortar powder, and sulfates.

10. A composition according to claim 1 including:
(a) additive selected from pigments, dyes, antioxides, ultraviolet blockers or absorbers, ozone blockers; and, plastizer.

11. A composition according to claim 1 wherein:
(a) the polymer comprises a mixture of polystyrene and styrene-ethylene-butylene-styrene block copolymer.

12. A composition according to claim 1 including:
(a) methanol.

13. A composition according to claim 1 including:
(a) isobutylene-butane copolymer plastizer.

14. A composition according to claim 1 including:
(a) dioctyl phthalate plastizer.

* * * * *